Patented Oct. 19, 1954

2,692,224

UNITED STATES PATENT OFFICE 2,692,224

HYDROGENATIVE CRACKING OF HEAVY HYDROCARBONS IN THE PRESENCE OF HYDROGEN FLUORIDE AND A PLATINUM-CHARCOAL CATALYST COMPOSITE

Heinz Heinemann, Drexel Hill, Pa., assignor to Houdry Process Corporation, Wilmington, Del., a corporation of Delaware No Drawing. Application February 1, 1951, Serial No. 208,985

2 Claims. (Cl. 196—53)

The present invention relates to a process for hydrogenative cracking and more particularly to the catalytic cracking of heavy hydrocarbons, such as gas oil and heavy petroleum fractions or residua, under pressure and in the presence of added hydrogen and of a hydrogenation catalyst which has no substantial cracking activity.

In hydrogenative cracking, catalysts containing alumina or clay activated by hydrofluoric acid as a cracking component and an oxide or sulfide of a heavy metal as a hydrogenative component have been found to be very active. Hydrofluoric acid itself also is an active cracking catalyst. Unsaturated products are necessarily formed by the catalytic cracking operation, which unsaturates as a result of polymerization and condensation may tend to form substantial amounts of tar and coke, unless suitably selected conditions are maintained to hydrogenate the unsaturated products initially formed, thus preventing their build-up into highly polymerized products.

It is an object of the present invention to prevent excessive breakdown of hydrocarbon molecules by cracking to normally gaseous products, and the polymerization and condensation of unsaturated cracked products formed. This object is achieved in accordance with the invention by hydrogenating these unsaturated products instantaneously on their formation, to produce more saturated hydrocarbons which have no tendency for forming polymers or condensation products.

It is another object of the invention to combine cracking of heavy hydrocarbons in the presence of cracking catalysts with hydrogenation of cracked products in the presence of hydrogenating catalysts and of large amounts of free hydrogen, in such a manner that any coke that may nevertheless be formed in the cracking operation is not deposited on the solid catalyst to substantial extent, or at least is not deposited principally on or in interfering relation to the active hydrogenative centers of the solid catalyst.

Other objects and advantages of the invention will be apparent from the subsequent description and the claims.

I have found that excellent results are obtained if in hydrogenative cracking of heavy hydrocarbons the cracking operation takes place by homogeneous catalysis while the hydrogenation takes place by heterogeneous catalysis. For this purpose, a cracking catalyst is employed which is in homogeneous phase with the hydrocarbons under treatment at operation conditions, while the hydrogenation catalyst employed, being and remaining solid under operation conditions, is in heterogeneous phase with the hydrocarbons under the same conditions, but has substantially no cracking activity. Fouling of one of the catalysts by products of reaction from the catalytic reaction involving the other catalyst is prevented or substantially inhibited by this method. Coke or tar deposition which is largely due to the cracking and which would deactivate solid catalysts will, with the new method, not be deposited on the hydrogenation catalyst except possibly by mechanical filtering action. Even in this case, however, such deposition will not tend to concentrate selectively at or near the active centers of the hydrogenation catalyst, and need not necessarily interfere with the hydrogenating function. The tendency of such cracking catalysts as aluminum chloride for promoting side reactions, such as polymerization and condensation and consecutive reactions, is largely inhibited by the presence of the hydrogenative catalyst and of substantial amounts of added hydrogen.

Instead of carrying out the cracking by homogeneous catalysis and the hydrogenation by heterogeneous catalysis, the process can also be carried out with a certain degree of success in such a manner that heterogeneous catalysis is used in the cracking operation and homogeneous catalysis in the hydrogenation.

Cracking catalysts suitable for the new process are, for example, such gasiform materials as hydrogen halides, particularly hydrofluoric acid, boron trifluoride, or mixtures of the two, and gaseous halogens; and normally liquid or solid substances liquefiable and/or vaporizable under reaction conditions, such as bromine, iodine, and Friedel-Crafts catalysts, e. g. aluminum chloride; in other words, all such cracking catalysts which will be in homogeneous phase with the hydrocarbon charge under operating conditions. Promoters, such as hydrochloric acid for aluminum chloride, can be added, if required or desirable.

As hydrogenation catalysts all such catalysts can be employed which promote or enhance hydrogenation of unsaturated hydrocarbons and are compatible with the cracking catalyst employed. Thus, oxides and sulfides of molybdenum, tungsten, vanadium, chromium and the like as well as metals like iron, nickel, cobalt, or precious metals on carriers such as alumina or mixtures of such catalysts, can be used in most cases, if desired also with addition of suitable promoters. Alumina, silica, and magnesia, or combinations of these should not be used as carriers for the hydrogenating catalyst where hydrofluoric acid is used as the cracking catalyst alone or in combination with other substances. In such a case charcoal can, for example, be employed as carrier or support for the hydrogenation catalyst.

In the case of heterogeneous cracking catalysis combined with homogeneous hydrogenation catalysis, a solid, stationary catalyst, such as silica-alumina, can be employed as the cracking catalyst and a liquid metal complex of an organic compound as the hydrogenation catalyst, such as a nickel or cobalt chelate.

The reaction conditions for the process of the invention mainly depend on the types of the catalysts and, particularly, on that of the cracking catalyst used. Preferably, temperatures in the range of 700° to 1000° F. are employed, the exact temperature being determined according to the type of the crackng catalyst. The pressures and the hydrogen to oil ratios are suitably chosen such that a hydrogen partial pressure of at least 200 lbs. per square inch is obtained. The space rate can, for example, vary between 0.1 and 10 volumes of hydrocarbons (as liquid) per volume of solid catalyst per hour. The amount of the catalysts to be employed in homogeneous phase depends largely on the type of said catalysts. Thus, the amount of cracking catalyst can be in the order of 0.1 per cent to 50 per cent by weight of the hydrocarbons to be treated. If halogens are used as cracking catalyst, 2 per cent to 5 per cent have been found suitable, while 6 to 50 per cent are required when hydrofluoric acid is used for this purpose.

In carrying out the process, one can, for example proceed in such a manner that a mixture of hydrocarbons and hydrofluoric acid is passed in gaseous or vapor phase and under suitable conditions of temperature and pressure over a solid hydrogenative catalyst, such as a heavy or noble metal, for instance Ni on an inert HF-resistant support, or platinum on charcoal, or the like, in the presence of large amounts of hydrogen.

*Example I*

(a) A high pressure hydrogenation bomb was charged according to the known process of destructive hydrogenation with light East Texas gas oil and 10% by weight of a catalyst composed of a charcoal carrier containing 0.25% Pt as the sole catalyst. The bomb was pressured with hydrogen and heated to about 700° F. so that a pressure of 1600 lbs. per square inch was obtained, and the bomb was maintained at this temperature for half an hour. The liquid product obtained after cooling the bomb, upon analysis, showed a content of about 5% gasoline, corresponding to 5% by weight of the feed.

(b) To an otherwise identical charge 6% by weight of hydrofluoric acid as a cracking catalyst was added, in accordance with the present invention, and the contents of the bomb were treated under corresponding conditions. The liquid reaction product contained over 70% by weight of gasoline corresponding to about 60% by weight of the feed, and this gasoline was completely saturated.

*Example II*

(a) Light East Texas gas oil was charged to a reaction zone formed by a steel case and containing 100 cc. of catalyst at a temperature of about 900° F., a pressure of about 500 lbs. per square inch, a space rate of 1 volume of liquid per volume of catalyst per hour, and a hydrogen to oil molecular ratio of 4. With steel turnings used as the sole catalyst, 20% by weight of gasoline was contained in the liquid product, corresponding to 16% by weight of the feed.

(b) When the case was charged with a 0.25% platinum on charcoal catalyst as the sole catalytic material, 38% by weight of gasoline was contained in the liquid product, corresponding to 21% by weight of the feed.

(c) By addition of 6% of hydrofluoric acid to the light East Texas gas oil charged to the steel case reaction zone containing the same kind of platinum on charcoal hydrogenative catalyst, and otherwise maintaining the same process conditions as before, 54% gasoline was found in the liquid product, corresponding to 40% of the feed.

While substantial amounts of coke were formed on the steel turnings constituting the sole catalyst in the aforementioned process, no coke deposition is observed when the process is carried out with the platinum on charcoal catalyst and in the presence of the hydrofluoric acid cracking catalyst.

*Example III*

The same type of gas oil as used before is charged to the same reaction zone as employed in Example II together with 2% by weight of iodine as cracking catalyst, and with the use of 10% nickel on celite as hydrogenative catalyst. The operation is carried out at a temperature of about 800° F., a pressure of about 1500 lbs. per square inch, space velocities of about 2 volumes oil per hour per volume of catalyst and a hydrogen to oil ratio of 6 moles. A conversion of about 30.2% by weight of the feed is obtained, consisting of 28.2% by weight of gasoline, 1.4% $C_4$ hydrocarbons, and 0.7% of dry gas. The liquid product is completely saturated and no coke formation is observed.

*Example IV*

Instead of the catalysts employed in Example III, 2% by weight of bromine and 1% of platinum on charcoal were employed, all other conditions being as indicated in Example III. 18.4% conversion was obtained with a product distribution of 16.4% by weight of gasoline, 0.6% of $C_4$ hydrocarbons and 0.9% of dry gas.

Instead of the light gas oil used in the foregoing examples, any other gas oil or heavy hydrocarbon fraction or residuum can be treated under corresponding conditions with the same or other cracking catalysts and hydrogenative catalysts of the type described, in combination. Instead of treating the hydrocarbon feed under such conditions that both this feed and the cracking catalyst are in gas or vapor phase, the conditions of temperature and pressure can also be such that they both are in liquid phase.

In known hydrogenative cracking processes using solid dual-function catalysts, unless extremely high pressures are employed which are economically unattractive, the rate of coke deposition, particularly in the case of heavier oils, is such that relatively frequent regeneration of the catalyst must be practiced. The present process when employing cracking catalysts in homogeneous phase, permits successful operation over long on-stream periods under practical pressure elevation, even in the cracking of such heavier oils, inasmuch as any coke produced in the cracking reaction does not foul or substantially deactivate the solid hydrogenating catalyst, as hereinabove explained.

Obviously many modifications and variations

I claim as my invention:

1. A process for the hydrogenative catalytic cracking of heavy hydrocarbons which comprises contacting said hydrocarbons with solid and gaseous catalysts in the presence of an added substantial amount of free hydrogen, at a temperature in the range of 700° to 1000° F., at pressures and hydrogen to hydrocarbon ratios such that a hydrogen partial pressure of at least 200 lbs. per square inch is obtained, and at space rate of 0.1 to 10 volumes of hydrocarbons as liquid per volume of solid catalyst per hour, said gaseous catalyst comprising hydrofluoric acid which is in homogeneous phase with the hydrocarbons under treatment at the operating conditions, and said solid catalyst composed of up to 1% Pt distributed on a charcoal support being in heterogeneous phase with said hydrocarbons under the same conditions.

2. A process for hydrogenative catalytic cracking of heavy hydrocarbon oils which comprises bringing an oil together with added hydrogen and hydrofluoric acid in homogeneous phase with the oil into contact with a solid hydrogenating catalyst having no appreciable cracking activity, said catalyst being composed of a small quantity of platinum distributed in charcoal, said contact being effected at catalytic cracking temperature and at a partial hydrogen pressure of at least 200 pounds per square inch.

References Cited in the file of this patent

UNITED STATES PATENTS

| Number | Name | Date |
|---|---|---|
| 2,119,647 | Pier et al. | June 7, 1938 |
| 2,221,952 | Pier et al. | Nov. 19, 1940 |
| 2,341,782 | Ipatieff et al. | Feb. 15, 1944 |
| 2,411,726 | Holroyd et al. | Nov. 26, 1946 |
| 2,426,273 | Johnstone | Aug. 26, 1947 |
| 2,479,109 | Haensel | Aug. 16, 1949 |
| 2,497,176 | Mason | Feb. 14, 1950 |

FOREIGN PATENTS

| Number | Country | Date |
|---|---|---|
| 427,883 | Great Britain | Apr 29, 1935 |